United States Patent
Thienes

Patent Number: 6,062,737
Date of Patent: May 16, 2000

[54] WHEEL HUB RETENTION APPARATUS

[76] Inventor: James E. Thienes, 5715 Highlands Trail N., Lake Elmo, Minn. 55042

[21] Appl. No.: 09/185,465

[22] Filed: Nov. 3, 1998

[51] Int. Cl.[7] .................................................. F16C 43/04
[52] U.S. Cl. ........................ 384/589; 384/562; 384/563; 384/571; 384/585
[58] Field of Search .................................... 384/585, 584, 384/583, 563, 559, 562, 571, 589, 517, 519, 537, 540, 544

[56] References Cited

U.S. PATENT DOCUMENTS

| | | |
|---|---|---|
| 929,851 | 8/1909 | Hess . |
| 1,380,708 | 6/1921 | Ford . |
| 1,754,892 | 4/1930 | Hughes . |
| 1,950,592 | 3/1934 | Bock ........................................ 384/589 |
| 2,033,156 | 3/1936 | Shafer ...................................... 384/584 |
| 2,043,272 | 6/1936 | Wallgren . |
| 2,052,524 | 8/1936 | Baker ....................................... 384/589 |
| 3,957,385 | 5/1976 | Ullberg . |
| 4,304,502 | 12/1981 | Stratienko . |
| 4,611,503 | 9/1986 | Kocher ................................. 384/562 X |
| 4,732,497 | 3/1988 | Sawa et al. . |
| 5,009,539 | 4/1991 | Muellenberg . |
| 5,011,306 | 4/1991 | Martinie . |
| 5,147,144 | 9/1992 | Kasai . |
| 5,259,676 | 11/1993 | Marti . |
| 5,795,037 | 8/1998 | Hagelthorn ......................... 384/562 X |

*Primary Examiner*—Thomas R. Hannon
*Attorney, Agent, or Firm*—Merchant & Gould P.C.

[57] ABSTRACT

A bearing assembly for securing a wheel to a vehicle includes a spindle having a shaft portion defining a longitudinal bore. A flange, adapted for connection to the wheel, projects radially outward from the shaft portion. A threaded region is positioned at one end of the shaft, and a radial shoulder is positioned between the threaded region and the flange. The bearing assembly also includes a driven axle fixedly mounted within the longitudinal bore of the spindle, and a carrier mounted over the shaft portion of the spindle between the threaded region and the radial shoulder. The carrier is adapted for connection to the vehicle. The bearing assembly further includes a pair of tapered bearings mounted between the shaft portion of the spindle and the carrier, and a compression member threaded on the threaded region of the shaft portion for pre-loading the tapered bearings. The bearings are pre-loaded by threading the compression member on the threaded region such that the tapered bearings are axially compressed between the radial shoulder of the spindle and the compression member.

6 Claims, 2 Drawing Sheets

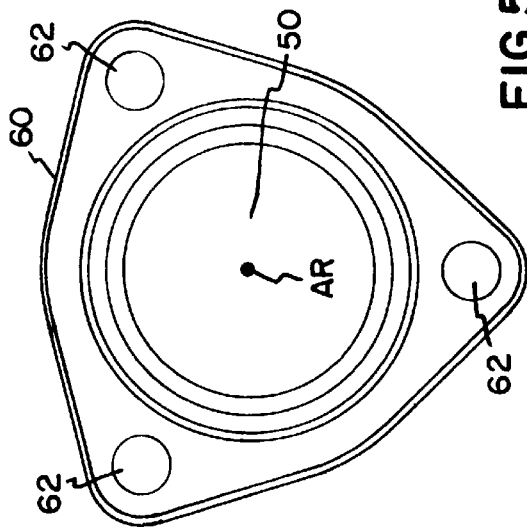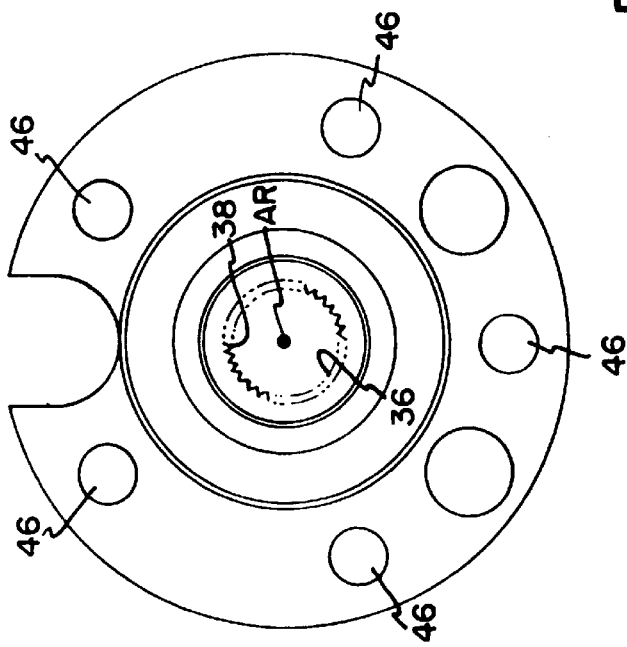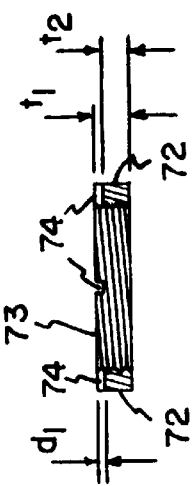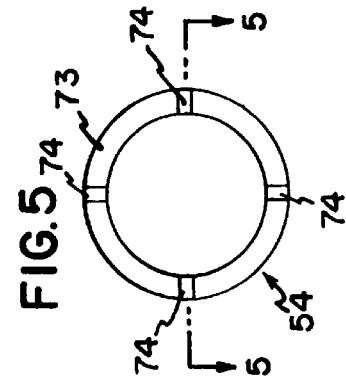

WHEEL HUB RETENTION APPARATUS

FIELD OF THE INVENTION

This invention relates generally to wheel hub assemblies for motor vehicles and more particularly to a hub and spindle assembly having tapered bearings for front wheel drive vehicles.

BACKGROUND OF THE INVENTION

It is commonplace in the motor vehicle industry for the vehicle to have a wheel and hub assembly having a wheel hub and a spindle. In traditional wheel hub assemblies, the road engaging wheel/tire is connected to a spindle assembly that is rotatably mounted in a stationary hub portion that is connected to the vehicle. The spindle is rotatably mounted on bearings interposed between the stationary hub and the rotating spindle. In front wheel drive hub/spindle assemblies, the spindle is operatively connected to and driven by an axle of the motor vehicle.

Tapered bearings have been found to be particularly advantageous for use in such assemblies. The tapered bearings are coaxially mounted within the stationary hub or carrier portion of the assembly, about the axis of the axle. Tapered bearings must have proper specified load or pre-load pressure applied to them in order to operate efficiently and for obtaining maximum life. In the past, pre-load pressure has been applied to the bearings from the inboard side of the spindle assembly by means of a lock ring applied to the spindle shaft by a press-fit technique. The lock ring adheres to the outer spindle surface by the frictional interface engagement between the lock ring and the spindle as the lock ring slides along the spindle. As the lock ring slides along the spindle shaft, it slidably engages and applies pressure to the tapered bearing assembly. With such systems, it is extremely difficult to accurately axially position the lock ring relative to the spindle so as to apply precise pre-load pressure to the tapered bearings. It can be appreciated that due to the method of assembling the lock ring to the spindle, pressure to the lock ring can only be applied in one direction. Accordingly, it is extremely difficult to accurately position the lock ring relative to the shaft and the tapered bearings so as to apply the optimum pre-load pressure to the tapered bearings. Application of too much pressure to the bearings can result in premature bearing failure; whereas not enough pressure will result in a loose hub/spindle assembly which will also cause premature failure. Therefore, there is a significant need for a hub/spindle assembly and apparatus which allows optimum pre-load pressure to be applied to the tapered bearing assembly.

The press-fit lock ring hub/spindle structure of the prior art is also not user friendly from a manufacturing viewpoint. It is typical for such press-fit lock rings to be applied by impact tools over which the assembler has little application pressure control. Further, once the press-fit lock ring assembly is applied to the spindle, it is very difficult to later change the ring position or to remove it in the event of a subsequent repair operation.

As a result of the foregoing issues with hub/spindle assemblies incorporating tapered bearings, a number of hub/spindle manufacturers have entirely eliminated the tapered bearings from such assemblies in favor of less efficient cylindrical ballbearing assemblies which do not require accurate pre-load pressure to be applied to the bearing assembly. A disadvantage of the use of such cylindrical ballbearing assemblies is that their incorporation into the spindle assembly typically requires the thickness of the hub or bearing carrier portion of the assembly to be thinned down in order to accept the cylindrical bearing. Others have resorted to heat treating both the bearing carrier and spindle assemblies and actually using them as a raceway for ball-bearings inserted therebetween, such that the entire hub and spindle assembly itself acts as a bearing.

The present invention addresses the needs and shortcomings of prior hub/spindle assemblies for driven spindle configurations. The invention provides a simple, reliable and cost-effective approach for assembling the hub/spindle assembly in a manner that incorporates the advantages of using tapered bearings therewith, and for accurately and precisely applying pre-load pressure to the bearings so as to obtain maximum performance and life therefrom. The invention also provides for an accurate and reliable seal configuration for maintaining the lubrication within the hub/spindle assembly.

SUMMARY OF THE INVENTION

One aspect of the present invention relates to a bearing assembly for securing a wheel to a vehicle. The bearing assembly includes a spindle having a shaft portion defining a longitudinal bore. A flange, adapted for connection to the wheel, projects radially outward from the shaft portion. A threaded region is positioned at one end of the shaft, and a radial shoulder is positioned between the threaded region and the flange. The bearing assembly also includes a driven axle fixedly mounted within the longitudinal bore of the spindle, and a carrier mounted over the shaft portion of the spindle between the threaded region and the radial shoulder. The carrier is adapted for connection to the vehicle. The bearing assembly further includes a pair of tapered bearings mounted between the shaft portion of the spindle and the carrier, and a compression member threaded on the threaded region of the shaft portion for pre-loading the tapered bearings. The bearings are pre-loaded by threading the compression member on the threaded region such that the tapered bearings are axially compressed between the radial shoulder of the spindle and the compression member.

A variety of advantages of the invention will be set forth in part in the description which follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows:

FIG. 2 is a plan view of a carrier constructed in accordance with the principles of the present invention;

FIG. 3 is a plan view of a spindle constructed in accordance with the principles of the present invention;

FIG. 4 is a plan view of a compression nut constructed in accordance with the principles of the present invention; and FIG. 5 is a cross-sectional view taken along section line 5—5 of FIG. 4.

DETAILED DESCRIPTION

Figure 1:
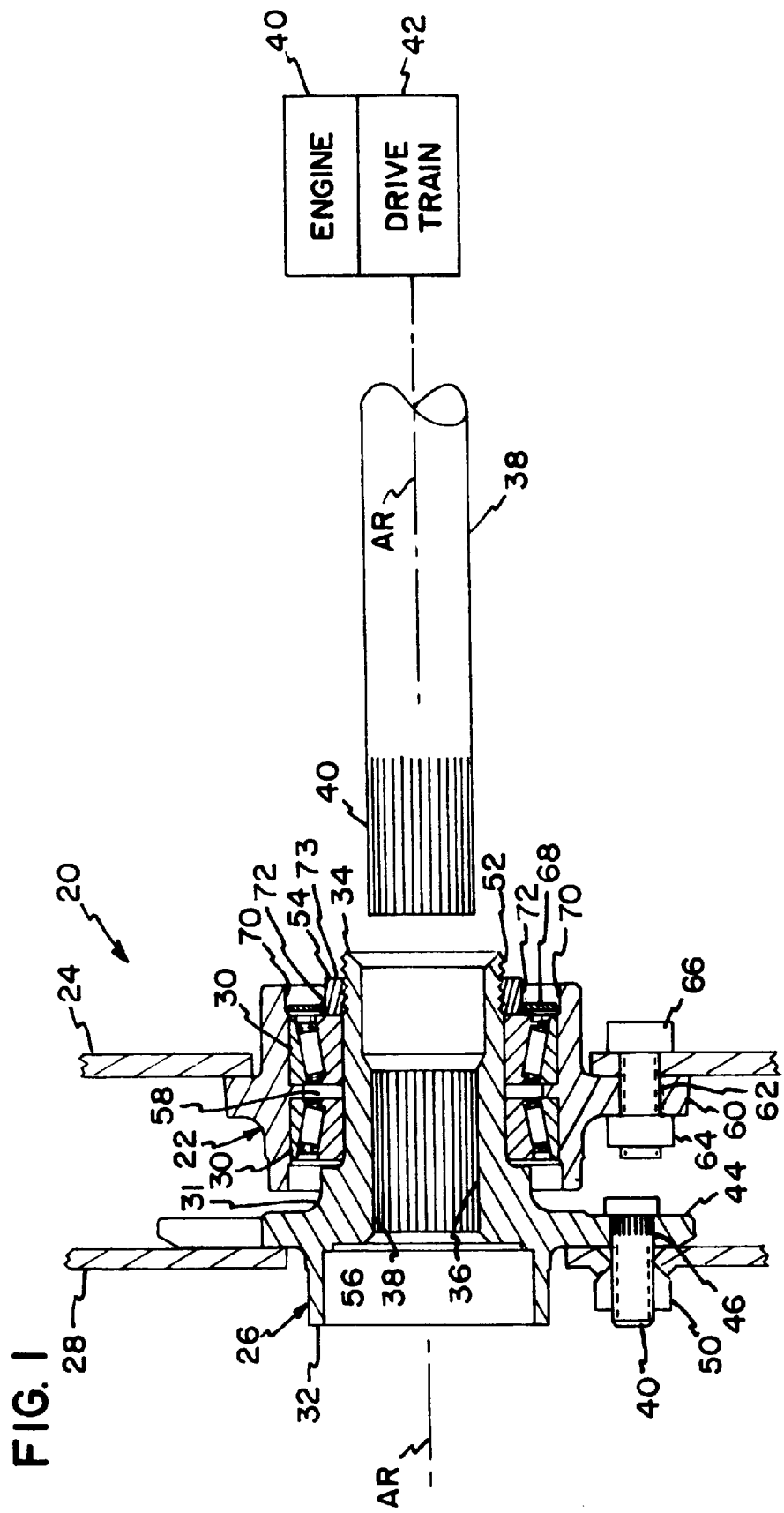
FIG. 1 is a cross-sectional view cut longitudinally through a bearing assembly constructed in accordance with the principles of the present invention.

Reference will now be made in detail to exemplary aspects of the present invention which are illustrated in the accompanying drawings. Wherever possible, the same reference numbers will be used throughout the drawings to refer to the same or like parts.

FIG. 1 is a cross-sectional view illustrating a bearing assembly 20 constructed in accordance with the principles of the present invention. The bearing assembly 20 is adapted for securing a wheel to a vehicle. For example, as shown in FIG. 1, the bearing assembly 20 includes a carrier 22 connected to an axle flange or frame member 24 of the vehicle. A spindle 26 is rotatably mounted within the carrier 22. The spindle 26 is connected to a rim 28 of the wheel. Two tapered bearings 30 are mounted between the carrier 22 and the spindle 26 for allowing the spindle 26 to rotate relative to the carrier 22.

The spindle 26 includes a shaft portion 31 having a first end 32 positioned opposite from a second end 34. The shaft portion 31 defines a longitudinal bore 36 that extends along an axis of rotation $A_r$ of the spindle 26. A driven shaft 38 is fixedly mounted within the longitudinal bore 36 (for clarity, the shaft 38 is shown removed from the longitudinal bore 36). To inhibit relative rotation between the spindle 26 and the shaft 38, the spindle 26 defines a plurality of inner spindle 38 that mate or interlock with splines 40 formed at one end of the driven shaft 38. The driven shaft 38 is preferably driven by an engine 40 and drive train 42 as is conventionally known in the art. In one particular embodiment of the present invention, the driven axle 38 comprises a front axle of a front wheel drive vehicle.

The spindle 26 preferably includes a flange 44 that projects radially outward from the shaft portion 31 at a location adjacent to the first end 32 of the shaft portion 31. As shown in FIG. 3, the flange 44 preferably includes the plurality of circumferentially spaced openings 46 for use in connecting the spindle 26 to the wheel rim 28. For example, as shown in FIG. 1, conventional lug nuts 50 and bolts 48 can be used to secure the spindle 26 to the wheel rim 28.

The spindle 26 also includes a plurality of outer threads 52 positioned adjacent to the second end 34 of the shaft portion 31. A compression lock ring 54 having internal threads is threaded on the outer threads 52 of the shaft portion 31. The spindle 26 also includes a radial shoulder 56 that projects radially outward from the shaft portion 31 at a location between the threaded region 52 and the flange 44. The tapered bearings 30 are mounted over the shaft portion 31 at a location between the radial shoulder 56 and the compression lock ring 54. By rotating the compression lock ring 54 in a first direction about the axis of rotation $A_r$, the compression lock ring 54 is moved axially toward the radial shoulder 56 such that the tapered bearings 30 are compressed between the radial shoulder 56 and the compression lock ring 54. By continuing to rotate the compression lock ring 54 in the first direction, the pressure or pre-load applied to the tapered bearings 30 is progressively increased. In contrast, by rotating the compression lock ring 54 in a second direction about the axis of rotation $A_r$, the compression lock ring 54 backs axially away from the radial shoulder 56 such that the pre-load applied to the tapered bearings 30 is reduced.

The compression lock ring 54 has numerous advantages over the prior art. For example, the compression lock ring 54 allows the pressure applied to the tapered bearings 30 to be precisely controlled such that an optimum pre-load pressure is applied to the tapered bearings. By using an optimum pre-load pressure, the useful lives of the bearings 30 can be extended. Furthermore, as opposed to press fit type compression members, the pre-load applied to the bearing members 30 by the compression lock ring can be easily increased or decreased by rotating the compression nut 54 in either the first or second direction about the axis of rotation $A_r$. Thus, the pre-load pressure can be adjusted at the time of initial bearing installation, or during subsequent repair operations.

The carrier 22 defines an interior sleeve 58 in which the tapered bearings 30 are mounted. As shown in FIG. 2, the carrier 22 includes a radial flange 60 defining a plurality of holes 62 for allowing the carrier 22 to be fastened to the frame 24 of the vehicle. For example, as shown in FIG. 1, conventional nuts and bolts 64 and 66 can be used to secure the carrier 22 to the frame 24.

Referring back to FIG. 1, a radial grease seal 68 is preferably used to retain grease within the sleeve 58 of the carrier 22. The radial grease seal 68 is preferably generally annular in shape and includes a generally circular outer edge that contacts an inner surface 70 of the carrier 22, and a generally circular inner edge that contacts a substantially smooth, cylindrical outer surface 72 of the compression lock ring 54. When spindle 26 rotates, the inner edge of the seal 68 maintains a sliding engagement with the outer surface 72 of the lock ring 54. The radial seal 68 is preferably concentric with respect to the axle 38, and the axle 38 preferably extends through a central aperture defined by the radial seal 68. By projecting outward from the spindle 26 and through the radial seal 68, the axle 38 is able to be coupled to the drive train 42.

FIG. 4 shows a plan view of the compression lock ring 54. As shown in FIG. 4, the compression lock ring 54 includes a generally smooth axial surface 73 adapted to face away from the bearings 30 when the compression lock ring 54 is threaded on the spindle 26. The smooth axial surface 73 defines a plurality of circumferentially spaced spanner notches 74. The notches 74 are used to allow torque to be applied to the compression lock ring 54. For example, the notches 74 are preferably sized and configured to receive corresponding projections of a torque applying tool such as a torque gun. It will be appreciated that other means for engaging and rotating the compression lock ring could also be used. For example, in alternative embodiments, holes defined in the axial surface 73 could also be used to apply torque to the compression lock ring 54. Preferably, the holes do not intersect or impinge upon the outer surface 72 of the ring 54.

Referring now to FIG. 5, each notch 74 preferably has a depth $d_1$ that is less than ¼ or ⅛ the total thickness $t_1$ of the compression lock ring 54. By maintaining the depth $d_1$ of the notches 74 small relative to the total thickness $t_1$ of the compression lock ring 54, a relatively large thickness $t_2$ is provided for engagement between the outer generally cylindrical surface 72 of the compression lock ring 54 and the inner edge of the radial seal 68. In this manner, the compression lock ring 54 can be loosened and tightened without having the notches 74 interfere with the seal provided between the inner edge of the radial sealing member 68 and the circumferential surface 72 of the lock ring 54.

With regard to the foregoing description, it is to be understood that changes may be made in detail, especially in matters of the size, shape and arrangement of the parts without departing from the scope of the present invention. It is intended that the specification and depicted aspects be considered exemplary only, with a true scope and spirit of the invention being indicated by the broad meaning of the following claims.

I claim:

1. A bearing assembly for securing a wheel to a vehicle, the bearing assembly comprising:

a spindle including a shaft portion defining a longitudinal bore, the spindle including a flange that projects radially outward from the shaft portion adjacent a first end of the shaft portion, the flange being adapted for connection to the wheel, the spindle also including a threaded region positioned at a second end of the shaft, and a radial shoulder positioned between the threaded region and the flange;

a driven axle fixedly mounted within the longitudinal bore of the spindle;

a carrier mounted over the shaft portion of the spindle between the threaded region and the radial shoulder, the carrier being adapted for connection to the vehicle;

a pair of tapered bearings mounted between the shaft portion of the spindle and the carrier for allowing the spindle to be rotated relative to the carrier; and a compression member threaded on the threaded region of the shaft portion for pre-loading the tapered bearings, wherein the bearings are pre-loaded by threading the compression nut on the threaded region such that the tapered bearings are axially compressed between the radial shoulder of the spindle and the compression member.

2. The bearing assembly of claim 1, further comprising a radial seal extending radially between the carrier and the compression member for retaining grease within the carrier, wherein the driven axle extends through a central opening defined by the radial seal.

3. The bearing assembly of claim 2, wherein the compression member has a smooth cylindrical outer surface that maintains a sliding engagement with the radial seal when the spindle is rotated.

4. The bearing assembly of claim 1, further comprising means for allowing torque to be applied to the compression member.

5. The bearing assembly of claim 4, wherein the means for allowing torque to be applied comprises a plurality of notches circumferentially spaced about an axial face of the compression member.

6. The bearing apparatus of claim 5, wherein each notch has a depth less than ¼ a total thickness of the compression member.

* * * * *